(12) United States Patent
Baldwin et al.

(10) Patent No.: US 10,200,623 B1
(45) Date of Patent: Feb. 5, 2019

(54) IMAGE CAPTURE SETTING DETERMINATION IN FLASH PHOTOGRAPHY OPERATIONS

(71) Applicant: QUALCOMM Incorporated, San Diego, CA (US)

(72) Inventors: Cullum James Baldwin, San Diego, CA (US); Rengaraj Thirupathi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/786,205

(22) Filed: Oct. 17, 2017

(51) Int. Cl.
*H04N 5/235* (2006.01)
*H04N 5/247* (2006.01)
*H04N 5/232* (2006.01)
*H04N 5/225* (2006.01)

(52) U.S. Cl.
CPC ......... *H04N 5/2351* (2013.01); *H04N 5/2256* (2013.01); *H04N 5/23216* (2013.01); *H04N 5/23293* (2013.01); *H04N 5/247* (2013.01)

(58) Field of Classification Search
CPC ............... H04N 5/2351; H04N 5/2256; H04N 5/23216; H04N 5/247; H04N 5/23293
See application file for complete search history.

(56) References Cited

U.S. PATENT DOCUMENTS

| 9,715,079 B2 * | 7/2017 | Sasaki | G03B 35/08 |
| 2004/0150724 A1 * | 8/2004 | Nozaki | H04N 1/00347 348/211.4 |
| 2016/0381301 A1 * | 12/2016 | Shroff | H04N 5/23296 348/240.3 |
| 2017/0099443 A1 * | 4/2017 | Shroff | H04N 5/2621 |
| 2017/0180637 A1 * | 6/2017 | Lautenbach | H04N 5/23222 |

* cited by examiner

*Primary Examiner* — Hung H Lam
(74) *Attorney, Agent, or Firm* — QUALCOMM Incorporated

(57) ABSTRACT

Methods, devices, and systems for determining one or more image capture settings for use in flash photography are disclosed. In some aspects a device includes a memory and a processor that is coupled to a first camera, a second camera, a flash unit, and the memory. The processor can be configured to cause the flash unit to emit a flash during a flash operation having a first portion and a second portion. The processor can be further configured to cause the first camera to receive a plurality of image frames during the first portion, determine at least one image capture setting based on at least one of the plurality of frames received by the first camera, and cause the second camera to capture one or more image frames during the second portion based on the determined image capture setting.

30 Claims, 10 Drawing Sheets

IMAGE CAPTURE SETTING DETERMINATION IN FLASH PHOTOGRAPHY OPERATIONS

BACKGROUND

Field

This disclosure relates generally to determining image capture settings when a flash photography operation is performed. As one example, this disclosure relates to automated techniques for determining exposure control, focal distance, and/or white balance settings that may be applied to capture an image frame of a scene undergoing illumination by a flash unit.

Background

Some electronic devices include, or are coupled to, two or more cameras capable of capturing image frames and/or video (e.g., a sequence of image frames). In such devices, each camera can include its own associated lens and/or sensor, and each camera can be independently controlled. As a result, image frames captured by separate cameras in a multiple camera device can differ in terms of field-of-view, spatial resolution, pixel intensity, and/or color, for example. These differences in camera parameters can be utilized to provide certain improvements in user experience and/or image capture quality as compared to at least some electronic devices that include, or have access to, only a single camera. For example, devices having differently configured cameras can be used to capture an extended range of zoom as compared to some devices that include only a single camera.

SUMMARY

Aspects of the present disclosure are directed to methods and devices for determining image capture settings for use in flash photography operations. In one aspect a device includes a memory and a processor. The processor is coupled to a first camera, a second camera, and a flash unit. The processor is configured to cause the flash unit to emit a flash during a flash operation having a first portion and a second portion. The processor is also configured to cause the first camera to receive a plurality of image frames during the first portion using a first exposure length. At least one image capture setting for the second camera is determined based on at least one of the plurality of image frames received by the first camera during the first portion. The processor is also configured to cause the second camera to capture one or more image frames during the second portion based on the determined image capture setting. Each of the one or more image frames are captured by the second camera using a second exposure length that is greater than the first exposure length.

In some aspects, the processor can be further configured to cause the first camera to operate at a first frame rate during the first portion and cause the second camera to operate at a second frame rate during the second portion. In such aspects, the first frame rate can be higher than the second frame rate. The processor can be further configured to cause the second camera to receive one or more image frames during the first portion and determine the at least one capture setting for the second camera based on at least one image frame received by the second camera during the first portion. In some aspects the determined image capture setting can include an exposure control setting, a white balance setting, a focal distance setting, or a flash unit setting. The device can also include the flash unit, which can optionally include a display. The device can also include the first camera, and/or the second camera.

In other aspects, the processor is further configured to cause the flash unit to adjust at least one of an intensity and a color temperature of the flash emitted during the first portion. The processor can also be configured to cause the flash unit to emit the flash at a constant intensity and color temperature during the second portion. The flash intensity emitted during the first portion can be equal to a flash intensity emitted during the second portion. Additionally, the first portion can be preceded during the flash operation by a flash initialization portion and the processor can be configured to cause the flash unit to emit the flash during at least a portion of the flash initialization portion.

In additional aspects, the first portion and the second portion are continuous within the flash operation and the processor can optionally be configured to cause the flash unit to continuously emit the flash between the first potion and the second portion of the flash operation. Additionally, the flash operation can include a third portion that precedes the first portion, and the processor can be configured to cause the second camera to receive one or more image frames during the third portion and cause the first camera to apply at least one image capture setting during the first portion based on the one or more image frames received by the second camera during the third portion. The processor can also be configured to determine the image capture setting based on a mapping between an image capture setting for the second camera and an image capture setting for the first camera.

In another aspect, a method is disclosed. The method includes causing a flash unit to emit a flash during a flash operation having a first portion and a second portion, causing a first camera to receive a plurality of image frames during the first portion using a first exposure length, determining at least one image capture setting for a second camera based on at least one of the plurality of image frames received by the first camera during the first portion, and causing the second camera to capture one or more image frames during the second portion based on the determined image capture setting. Each of the one or more image frames are captured by the second camera using a second exposure length that is greater than the first exposure length.

In yet another aspect, a non-transitory computer-readable storage medium is disclosed. The non-transitory computer-readable storage medium stores instructions thereon that, when executed, cause one or more processors to cause a flash unit to emit a flash during a flash operation having a first portion and a second portion, cause a first camera to receive a plurality of image frames during the first portion using a first exposure length, determine at least one image capture setting for the second camera based on at least one of the plurality of image frames received by the first camera during the first portion, and cause the second camera to capture one or more image frames during the second portion based on the determined image capture setting. Each of the one or more image frames are captured by the second camera using a second exposure length that is greater than the first exposure length.

In a further aspect, a device is disclosed. The device includes means for causing a flash unit to emit a flash during a flash operation, the flash operation including a first portion and a second portion. The device also includes means for causing a first camera to receive a plurality of image frames during the first portion using a first exposure length. The device also includes means for determining at least one image capture setting for a second camera based on at least one of the plurality of image frames receive by the first camera during the first portion, and means for causing the second camera to capture one or more image frames during the second portion based on the determined image capture setting. The device operates such that each of the one or more image frames are captured by the second camera using a second exposure length that is greater than the first exposure length.

The details of one or more examples are set forth in the accompanying drawings and the description below. Other features, objects, and advantages will be apparent from the description, drawings, and claims.

DETAILED DESCRIPTION

Figure 1:
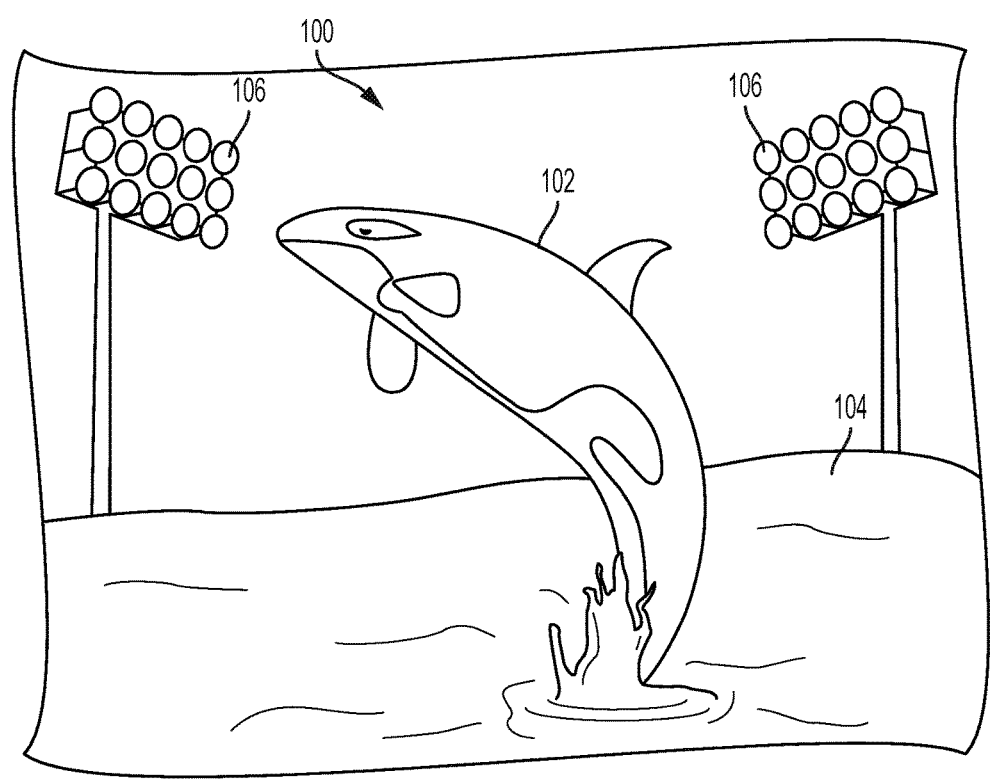
FIG. 1 depicts an example scene.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "causing," "accessing," "receiving," "sending," "using," "selecting," "determining," "normalizing," "multiplying," "averaging," "monitoring," "comparing," "applying," "updating," "measuring," "deriving," "estimating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, equivalents thereof, and the like.

Aspects of the present disclosure are applicable to any suitable electronic device (such as smartphones, tablets, laptop computers, digital cameras, web cameras, a security system, and so on) that includes, or has access to image data from, two or more cameras, and may be implemented in electronic devices having a variety of camera configurations. For example, the cameras may have similar or different capabilities (such as spatial resolution, color or black and white outputs, wide angle or telescopic views, same or different zoom capabilities, and so on). The cameras may also include a primary camera and one or more auxiliary cameras. While described below with respect to a device including two or more cameras, aspects of the present disclosure are also applicable to any number of cameras and camera configurations, and are therefore not limited to two cameras (such as a dual camera device). For example, aspects of the present disclosure can be applied to single camera devices and devices having more than two cameras.

Those having ordinary skill in the art will appreciate that electronic devices including, or having access to image data from, two or more cameras ("multiple camera devices") can sometimes address certain limitations of devices including only a single camera. For example, in electronic devices having limited form factors such as mobile phones, tablets, and/or wearable devices, the total track length of a camera lens is constrained based on a maximum depth or z-height dimension of the form factor. In many of these devices, it can be desirable to minimize the depth or z-height to provide a thin, less bulky device. As a result, a range of effective zoom for a device having only one camera can be limited based on form factor design constraints. In multiple camera devices, the range of effective zoom for the multiple camera module can be extended without increasing an overall depth or z-height dimension of a camera module by switching between two or more cameras having differing fields-of-view, optics, and/or sensor sizes. For example, a device can include first camera with a first field-of-view ("FOV") and a second camera with a second FOV that is narrower than the first FOV. In this way, image capture operations (e.g., image preview on a display and/or video capture) can use the first camera to provide image data for a scene and the second camera to provide image data for a zoomed-in portion of the scene.

Another example limitation of some single camera devices with limited form factors is a constraint in aperture size, which can affect light intake and depth-of-focus. Those having skill in the art will appreciate the tradeoffs in aperture size with relatively smaller apertures resulting in lower light intake and larger depth-of-focus than relatively larger apertures. In contrast, multiple camera devices can be configured to combine image data captured from different cameras to augment pixel intensity values and/or reduce noise. For example, some electronic devices can be provisioned with a first camera having an image sensor where different pixels are responsive to different colors of light (e.g., a Bayer sensor) and a second camera having a sensor having pixels responsive to all light (e.g., a mono sensor). Such devices can be configured to reduce noise and improve sharpness in low light conditions as compared to single camera devices by stacking overlapping portions of image frames from each camera that are correlated in time and adjusting signal values for color pixel values based on the image data from the mono sensor.

A single camera device with a restricted aperture size (e.g., a camera on a mobile phone, tablet, head-mounted display, watch, etc.) is also not able to adequately adjust a depth-of-field in certain scenes since the upper bound of the aperture is restricted. Additionally, such devices typically do not include adjustable apertures due to space and technical limitations. However, devices with two or more cameras having relatively small, fixed apertures can be used to generate a simulated depth-of-field effect or a simulated Bokeh effect via a depth map. For example, a depth map may be generated in such devices based on the offset of a pixel in a first image received by a first camera relative to a corresponding pixel in a second image received by a second camera (e.g., depth from pixel disparity values). The resulting depth map can be used for several purposes including, for example, a simulated depth-of-field adjustment or a simulated Bokeh effect. Such adjustments or effects can be applied artistically on larger and/or more expensive single camera devices (e.g., digital single-lens reflex ("DSLR") cameras) that use a large, adjustable aperture to create a narrow depth-of-field. This effect is commonly used for portraiture or other scenes where it may be desirable to accentuate one or more foreground objects of interest. In multiple camera devices, this effect can be generated in preview mode and/or applied to captured image frames by applying a depth-of-field blur to an image frame captured by a single camera based on an associated depth map derived using two or more cameras.

From these examples, it can be appreciated that there are many options and available configurations for multiple camera devices. It can also be appreciated that the configuration of the multiple cameras can be selected to address certain limitations in single camera devices, especially single camera devices that require a relatively small form factor.

As used herein, a flash unit refers to a device used in photography for producing a flash of artificial light (e.g., light that is generated for the purpose of a photography operation and is otherwise not present in the ambient environment) to help illuminate a scene. For example, a flash unit may be utilized to illuminate a dark scene to improve the quality and/or detail in a captured image frame of the dark scene. Additionally or alternatively, a flash unit can be used to capture detail of quickly moving objects by causing an image sensor to receive more light from the moving object(s). Further, a flash unit can also be used to adjust a color temperature of a scene by mixing the output light at a given color temperature with the ambient light incident on the scene.

Those having skill in the art will appreciate that a flash unit can include one or more flash elements capable of emitting light. For example, a flash unit can include one or more flashtubes, light emitting diodes ("LEDs"), flashlamps, flashbulbs, flashcubes, or electronic display elements. Examples of electronic display elements that can be used as flash elements include liquid crystal displays ("LCDs"), organic light emitting diode displays ("OLED"), active matrix OLED displays ("AMOLED"), and the like.

Flash units can include electronic circuitry to charge a capacitor to a voltage. When such a flash unit is triggered to initiate a flash operation (e.g., in response to a user input to capture an image frame and/or in response to a synchronized shutter command), the capacitor can be discharged through the one or more flash elements of the flash unit to emit light. Some electronic devices, for example, mobile phones, smartphones, tablets, security systems, connected cameras, IP cameras, digital still cameras, dash cameras, personal action cameras, laptop computers, desktop computers, drones, automobiles, wearable devices, and head mounted displays can include one or more flash units. In other implementations, one or more flash units can be communicatively coupled and/or synchronized with a physically separate imaging device to aid in image capture operations.

Turning now to FIG. 1, an example scene 100 is schematically depicted. The scene 100 is illuminated by light sources 106 and includes an Orcinus orca ("orca") 102 jumping out of a body of water 104 at nighttime. Due to the relatively dark scene conditions, color temperature of the light output by the light sources 116, and/or the high rate of motion of the orca 112 and displaced water 104, it can be desirable to capture an image frame of the scene 100 using one or more flash units that are synchronized with an integrated, or separate, image capture device (e.g., a camera or a camera module including one or more cameras). For example, as mentioned above, one or more flash units can be utilized during an image capture operation to emit artificial light so as to illuminate a dark or low light scene, to improve the capture quality (e.g., detail) of moving objects, and/or to adjust a color temperature of the captured scene.

Many existing imaging devices that are synchronized with a flash unit require a pre-flash period to determine one or more image capture settings. During a pre-flash period, an intensity emitted by the flash unit can be adjusted or maintained at a power level that is less than a power level that is needed for an image capture operation. As a result, such devices may result in a significant delay between a moment when an input to capture an image frame using a flash is received and the moment that the capture actually occurs. Hence, it can be frustrating for a user to capture an image using a flash unit when a subject, for example, the orca 102 that is depicted as breaching in scene 100 of FIG. 1, is moving because the window to capture the desired shot is short, and a pre-flash period delays the capture operation. This can be especially frustrating when there is not an opportunity to re-create a scene that was intended to be captured, for example, scene 100, sports sequences including loved ones, amusement park rides, other precious life moments, etc. Aspects of the present disclosure can be implemented to decrease the time required to capture an image frame using a flash unit as compared to existing techniques. Hence, as described in further detail below, various aspects of the present disclosure can be implemented to significantly improve a user experience in using a camera as compared to existing techniques.

Figure 2A:
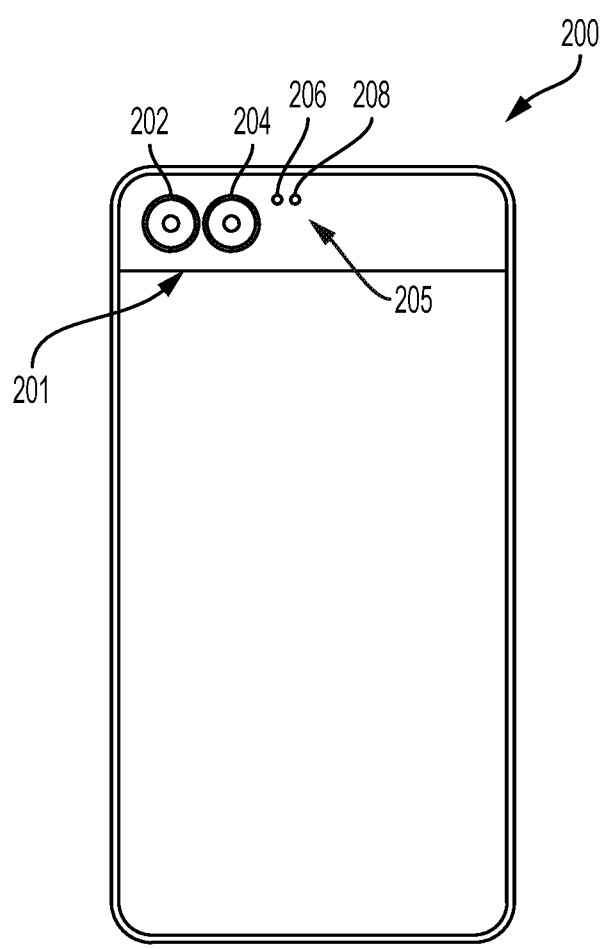
FIGS. 2A-2D depict examples of devices including a flash unit and multiple cameras.

FIG. 2A depicts an example device 200 including a dual camera module 201 with a first camera 202 and a second camera 204 arranged in a first configuration. The device 200 also includes a flash unit 205 including a first flash element 206 and a second flash element 208. In some implementations, the first flash element 206 can be a first flash element type and the second flash element 208 can be the same type of flash element. For example, the first flash element 206 and the second flash element 208 can each include one or more LEDs. In other implementations, the first flash element 206 can be a first flash element type and the second flash element 208 can be a different type of flash element. In some implementations, the first flash element 206 and the second flash element 208 can be controlled in concert to regulate an overall intensity output by the flash unit 205 and/or a color temperature of output light (e.g., by mixing outputs of each flash element).

Figure 2B:
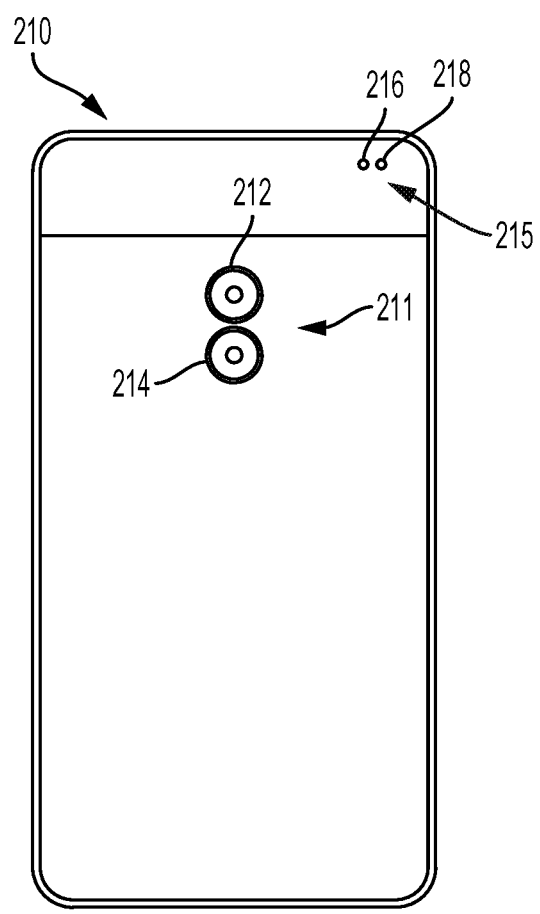

FIG. 2B depicts another example device 210 including a dual camera module 211 with a first camera 212 and a second camera 214 in a second configuration. In some aspects, one of the cameras (such as the first cameras 202 and 212) may be considered a primary, main, or master camera, and the other camera (such as the second cameras 204 and 214) may be considered an auxiliary or slave camera. Additionally or alternatively, the second cameras 204 and 214 may have a different focal distance, frame capture rate, spatial resolution, color responsivity, and/or field-of-view of capture than the first cameras 202 and 212. Although the first cameras 202, 212 and second cameras 204, 214 are depicted in FIGS. 2A and 2B as being disposed on a common side of example devices 200 and 210, it will be understood that in some implementations a first camera can be disposed so as to face a different direction than a second camera. Thus, techniques and aspects disclosed herein can be implemented using a front facing camera and a rear facing camera. Similarly, the techniques and aspects disclosed herein can be applied in devices having other camera configurations, for example, 360 degree capture devices having at least one camera with a field-of-view that at least partially overlaps or at least abuts a field-of-view of a second camera.

Still referring to FIG. 2B, the example device 210 includes a flash unit 215 having a first flash element 216 and a second flash element 218. Similar to the first and second flash elements 206 and 208 of the example device 200 of FIG. 2A, the first and second flash elements 216 and 218 can be similar flash elements or different. Additionally, those having skill in the art will appreciate that while two flash elements are schematically depicted in FIGS. 2A and 2B, an imaging device can include any number of flash elements. For example, an imaging device can include, or be coupled to, one or more flash units each including one, two, three, four, five, six, seven, or more flash elements. Further, those having skill in the art will appreciate that the spatial distribution of the flash elements of a flash unit can be differently configured than as is schematically illustrated in FIGS. 2A-2D.

Figure 2C:
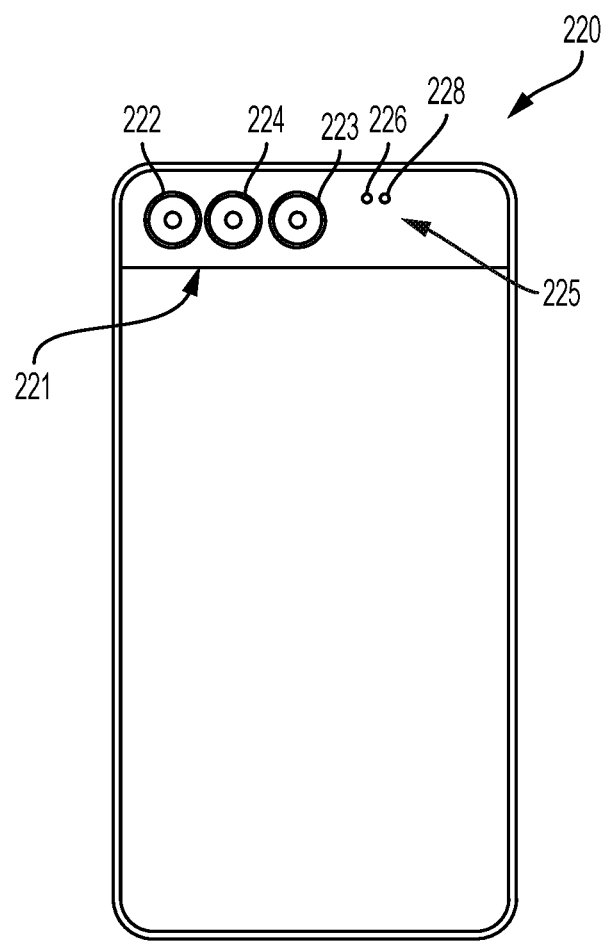

FIG. 2C depicts another example device 220 having a camera module 221 including a first camera 222, a second camera 224, and a third camera 223. In some implementations, two of the cameras, for example, the first camera 222 and the second camera 224, can be configured with different fields-of-view so as to provide an extended overall range of zoom (e.g., by switching between the first and second cameras 222, 224 based on zoom level) while the third camera 223 may include a sensor responsive to all wavelengths of light (e.g., a mono sensor) to enhance color images captured by one or more of the first camera 222 and second camera 224. The example device 200 also includes a flash unit 225 having a first flash element 226 and a second flash element 228. The flash unit 225 can be synchronized with any of the first camera 222, second camera 224, and third camera 223 to provide for a flash photography functionality when capturing image frames via any combination of the cameras.

Figure 2D:
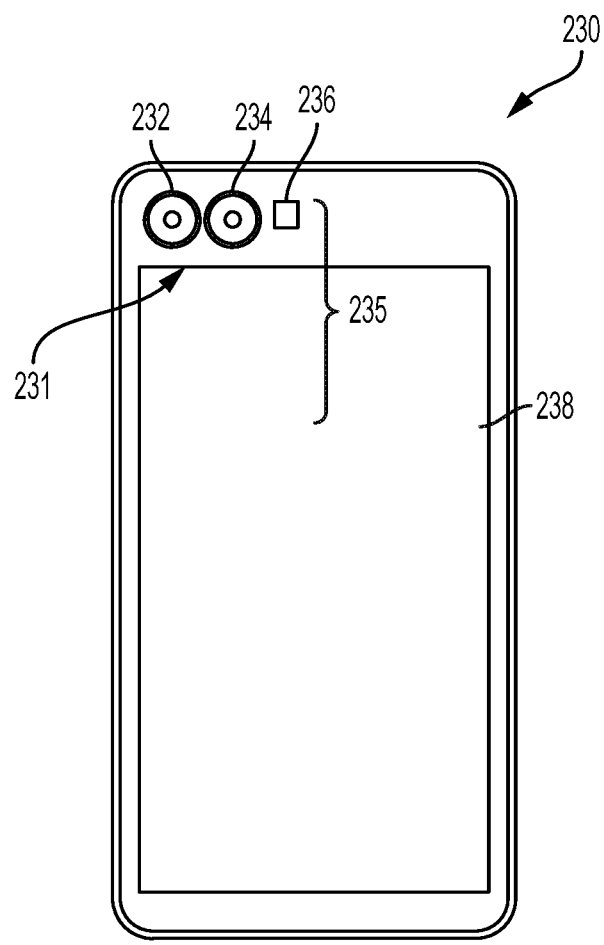

FIG. 2D depicts yet another example device 230 including a camera module 231. As shown, the camera module 231 includes a first camera 232 and a second camera 234. The device 230 also includes a flash unit 235. The flash unit 235 includes a first flash element 236 and a second flash element 238. In this example, the first flash element 236 and the second flash element 238 are different flash element types. More specifically, in this example, the display of the device 230 is configured to act as the second flash element 238 of the flash unit. Those having skill in the art will appreciate that aspects disclosed herein apply to any device or group of devices used in flash photography regardless of flash unit architecture and/or composition.

Although FIGS. 2A-2D depict discrete electronic devices 200, 210, 220, 230 each having more than one camera, the techniques disclosed herein are not limited to one or a specific number of physical objects, such as a host device for one or more cameras. Instead, multiple discrete devices may be utilized to implement at least some portions of this disclosure. For example, an image based security system with access to connected cameras that are separately located can implement aspects of the present disclosure. Similarly, as another example, a single device, such as any of the example devices 200, 210, 220, 230 of FIGS. 2A-2D can implement aspects of the present disclosure without receiving image data from a separate device. Thus, it will be understood that while the below description and examples use the singular term "device" to describe various aspects of this disclosure, the term "device" is not limited to a specific configuration, type, or number of objects.

Figure 3:
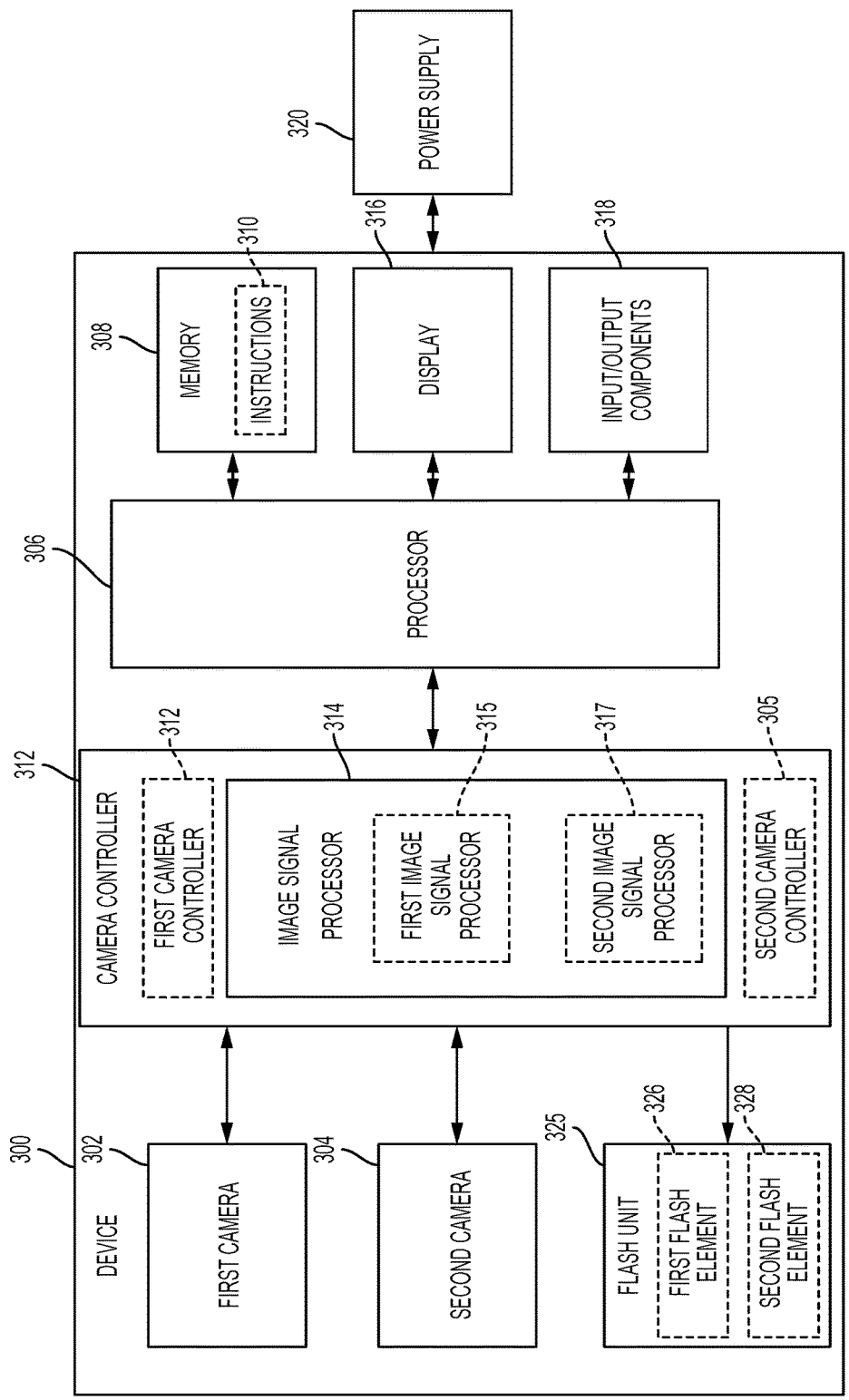
FIG. 3 is a block diagram of an example device including a flash unit and multiple cameras.

FIG. 3 is a block diagram of an example device 300 having multiple cameras including a first camera 302 and a second camera 304. The device 300 also includes a flash unit 325. The example device 300, which may be one implementation of the example devices 200, 210, 220, 230 of FIGS. 2A-2D, may be any suitable device capable of capturing images and/or sequences of image (e.g., video sequences), for example, wired and wireless communication devices (such as mobile phones, smartphones, tablets, security systems, dash cameras, personal action cameras, laptop computers, desktop computers, drones, automobiles, wearable devices, head mounted displays, and so on), digital cameras (including still cameras, video cameras, and so on), or any other suitable device.

In addition to the first camera 302 and the second camera 304, the example device 300 shown in FIG. 3 includes a processor 306, a memory 308 storing instructions 310, a camera controller 312, a display 316, and a number of input/output (I/O) components 318. The device 300 may include additional features or components not shown. For example, a wireless interface, which may include a number of transceivers and a baseband processor, may be included for a wireless communication device. Device 300 may include additional cameras other than the first camera 302 and the second camera 304. The disclosure should not be limited to any specific examples or illustrations, including example device 300. Those having skill in the art will appreciate that the example device 300 can be used for traditional photographic and video applications, high dynamic range imaging, panoramic photo and/or video, and stereoscopic imaging, for example.

The first camera 302 and second camera 304 may be capable of capturing individual image frames (such as still images) and/or capturing video (such as a succession of captured image frames). The first camera 302 and second camera 304 also may include one or more image sensors (not shown for simplicity), lenses, actuators, and/or shutters for receiving an image frame and providing the received image frame to the camera controller 312.

The memory 308 may be a non-transient or non-transitory computer readable medium storing computer-executable instructions 310 to perform all or a portion of one or more operations described in this disclosure. The device 300 may also include a power supply 320, which may be coupled to or integrated into the device 300.

The processor 306 may be one or more suitable processors capable of executing scripts or instructions of one or more software programs (such as instructions 310) stored within memory 308. In some aspects, the processor 306 may be one or more general purpose processors that execute instructions 310 to cause the device 300 to perform any number of different functions or operations. In additional or alternative aspects, the processor 306 may include integrated circuits or other hardware to perform functions or operations without the use of software. While shown to be coupled to each other via the processor 306 in the example of FIG. 3, the processor 306, memory 308, camera controller 312, the display 316, and I/O components 318 may be coupled to one another in various arrangements. For example, the processor 306, memory 308, camera controller 312, the display 316, and/or I/O components 318 may be coupled to each other via one or more local buses (not shown for simplicity).

The camera controller 312 may include an image signal processor 314, which may include a single processing resource that is shared by the first camera 302 and the second camera 304. Optionally, the image signal processor 314 can include a first image signal processor 315 that is configured to process image data received from the first camera 302, and the image signal processor 314 can include a second image signal processor 317 that is configured to process image data received from the second camera 304. Thus, it will be understood that some configurations may include a dedicated image signal processor for each of the first camera 302 and the second camera 304, and in other configurations the first camera and the second camera 304 may be coupled to a common image signal processor 314.

In some aspects, the image signal processor 314, or optionally first image signal processor 315 and/or second image signal processor 317, may execute instructions from a memory (such as instructions 310 from memory 308 or instructions stored in a separate memory coupled to the image signal processor 314) to control operation of the cameras 302 and 304. In other aspects, the image signal processor 314 may include specific hardware to control operation of the cameras 302 and 304. The image signal processor 314 may alternatively or additionally include a combination of specific hardware and the ability to execute software instructions. Moreover, in other implementations, the camera controller 312 can include a first camera controller 303 configured to control the first camera 302, and a second camera controller 305 configured to control the second camera 304. In this way, the first and second cameras 302, 304 can be controlled by a single controller module and/or by separate controller modules disposed within the camera controller 312.

In some example implementations, the camera controller 312 may receive instructions from the processor 306 and control operation of the first camera 302 and the second camera 304, and/or operation of the image signal processor 314 (or first and second image signal processors 315 and 317). For example, the processor 306 may receive image frame data processed by the image signal processor 314 and determine one or more image capture settings including automatic exposure control ("AEC"), automatic focus ("AF"), and automatic white balance ("AWB") settings for an upcoming frame based on the received image frame data. In some implementations, the processor 306 can activate the flash unit 325 to emit a pre-flash for use in determining AEC, AF, and/or AWB settings for an upcoming image frame to be captured using a full flash intensity emitted by the flash unit 325. Based on the determined image capture settings, the processor 306 may provide instructions to the camera controller 312. These instructions may include camera settings to be applied by the first camera 302 and/or second camera 304 such as exposure, sensor gain, etc., and may include digital image processing instructions to be applied by the image signal processor 314.

The display 316 may be any suitable display or screen allowing for user interaction and/or to present items (such as captured images and video) for viewing by a user. In some aspects, the display 316 may be a touch-sensitive display. The I/O components 318 may be or include any suitable mechanism, interface, or device to receive input (such as commands) from the user and to provide output to the user. For example, the I/O components 318 may include (but are not limited to) a graphical user interface, keyboard, mouse, microphone and speakers, and so on.

In some implementations, the processor 306 can be configured to control the display 316 to display a captured image, or a preview of one or more received images, to a user. The display 316 may also be configured to provide a viewfinder or bounding box when displaying a preview image for use by a user prior to capturing an image frame of a scene. For example, a bounding box may be used to identify one or more faces in a scene can be used to control AF operations. Additionally, the processor 306 can be configured to control the display 316 to emit light during an image capture operation in conjunction with a flash instruction. That is to say, although depicted as a separate functional block in the example device 300, those having skill in the art will appreciate that the display 316 can optionally be used as a flash element of the flash unit 325.

As illustrated, the flash unit 325 of the device 300 can include one or more flash elements. For example, the flash unit 325 can include a first flash element 326 and a second flash element 328. The processor 306 can be configured to transmit signals to the flash unit 325 via the camera controller 312 to control the first flash element 326 and/or second flash element 328 as part of a flash photography operation.

With continued reference to FIG. 3, the processor 306 may provide instructions that control the overall image capture functions of the device 300. For example, the processor 306 can instruct the first camera 302 and/or second camera 304 to capture raw image data. In some implementations, these instructions can be provided from the processor 306 to the camera controller 312. Similarly, the processor 306 can also provide instructions to the flash unit 325 to activate the first flash element 326 and/or second flash element 328 when capturing the raw image data. In some implementations, the processor 306 can monitor the brightness of one or more received image frames and instruct the flash unit 325 to emit a flash based on the monitored brightness.

As discussed below, in some examples, a flash photography operation can include, at least, a first portion (e.g., a pre-flash phase or a phase where image capture settings are determined) followed by a second portion (e.g., a flash capture phase). During the first portion, one or more image capture settings, for example an AEC, AF, and/or AWB setting can be determined based on one or more image frames that are received by the processor 306 as a flash is emitted by the flash unit 325. Once the image capture settings have been determined based on the first portion, the processor 306 may apply the determined image capture settings and instruct the first camera 302 and/or second camera 304 to capture one or more image frames during the second portion while a flash is emitted.

In some techniques for estimating image capture settings, a first portion of a flash operation (e.g., a pre-flash phase) may include emitting a lower intensity of light by the flash unit 325 than is emitted during the second portion (e.g., the flash capture phase). Reasons for emitting a lower intensity of light during the first portion can include reducing power consumption, preventing damage to the flash unit 325 caused by prolonged use, and/or minimizing undesirable effects to a subject in the scene (e.g., to reduce likelihood of a subject blinking and/or fidgeting due to flash intensity and/or to inhibit light exposure to sensitive materials such as older textiles or art capturing substrates). In some implementations, an intensity and/or color temperature of light output by the flash unit 325 during the first portion of the flash operation can be adjusted over a series of frames while in other embodiments the intensity and/or color temperature can be constant during the pre-flash phase. For example, in some implementations, the first portion of the flash operation can include two or more sub-portions with an intensity and/or color temperature of emitted flash being different between each sub-portion.

Many existing techniques utilize a main camera during the first portion (e.g., pre-flash phase) of a flash operation for receiving a series of image frames used by the processor to determine image capture settings to apply for use by the main camera during a second portion (e.g., flash capture phase). For example, a device may operate the main camera to receive 8 image frames, or more, or less, during a pre-flash phase and then operate the main camera to capture one or more image frames using image capture settings determined based on the image frames received during the pre-flash phase.

Figure 4:
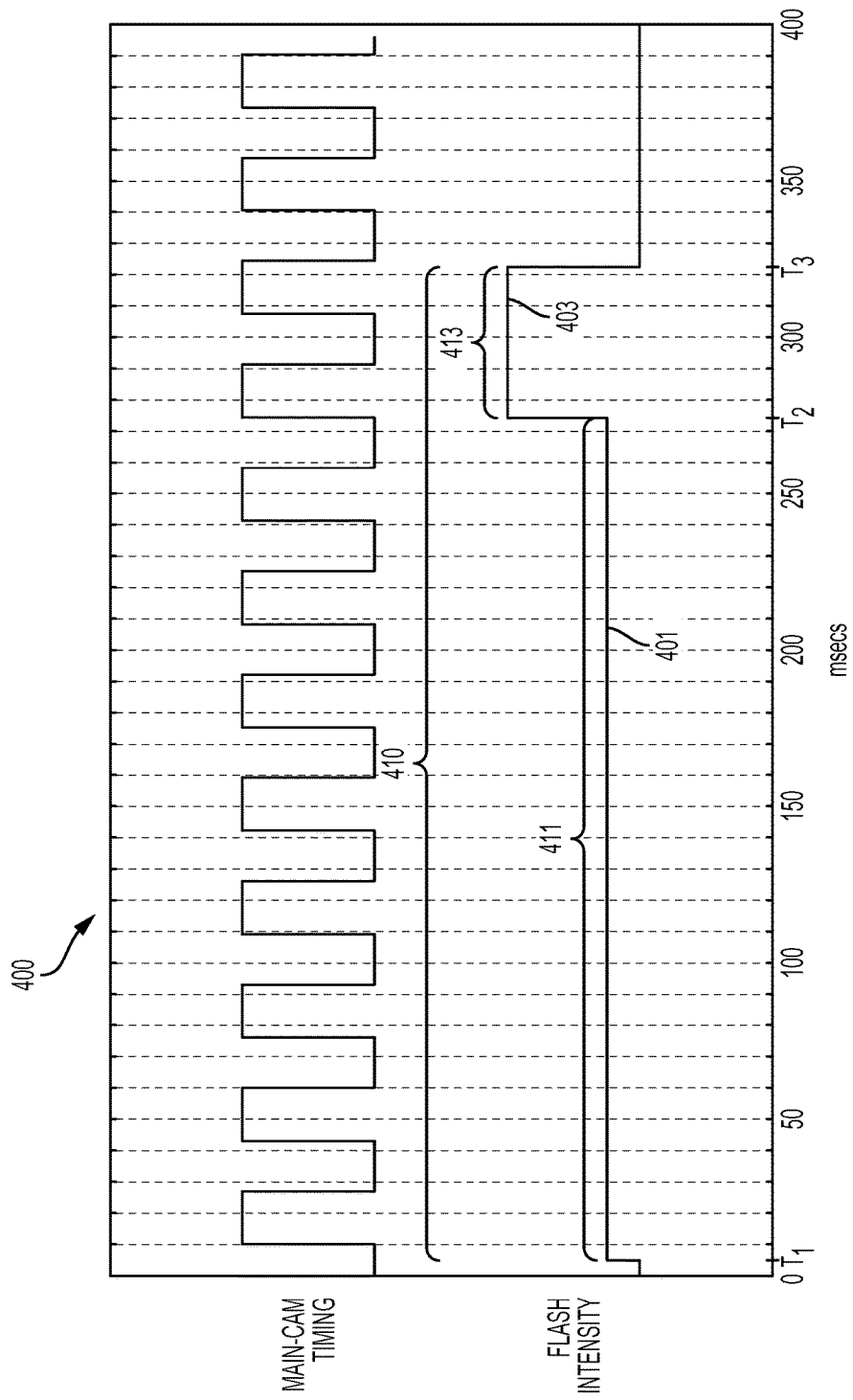
FIG. 4 is an illustrative timing diagram depicting one example operation of a flash photography operation.

FIG. 4 is an illustrative timing diagram 400 depicting an example operation of a flash photography operation. As shown in the timing diagram 400, a main camera exposes a series of frames 420 at a constant frame rate, for example, 30 frames per second ("fps"). Additionally, a flash unit emits light at a first intensity 401 during a first portion 411 of a flash operation 410 beginning at time $T_1$ and lasting until time $T_2$. At time $T_2$, the flash unit emits light at a second intensity 403 during a second portion 413 of the flash operation 410 until time $T_3$. Although the example timing diagrams described herein illustrate an intensity of light output by a flash unit during a flash operation, those having skill in the art will appreciate that color temperature can also be controlled and adjusted by a flash unit during a flash operation.

Still referring to FIG. 4, those having skill in the art will appreciate that the first portion 411 can be considered a pre-flash phase that is used broadly herein to generally refer to a period of time during which a flash unit is operated to emit a flash for at least a portion of the period of time, and during which received image frames are analyzed for use in determining image capture settings. It will also be appreciated that the determined image capture settings are applied to capture one or more image frames during the second portion 413 of the flash operation 410, which can be considered a flash capture phase. Further, it will be understood that the flash operation 410 can include additional portions, for example, a third portion that precedes the first portion where no flash is emitted by the flash unit. This third portion (not depicted) can be considered a no-flash phase when one or more processors coupled to the main camera determine and set one or more image capture settings (e.g., an exposure, white balance level, and/or focal depth) based on the characteristics exhibited in one or more image frames that are received by an image sensor with no flash emitted by the flash unit. In some implementations, a no-flash phase can be used to determine whether to trigger a flash operation and/or to determine an intensity for use during a pre-flash phase. Alternatively, the third portion can precede the first portion and include a flash initialization period where flash is emitted during at least a portion of the first portion as the flash unit is initialized and/or ramps up to a relatively stable intensity and/or color temperature required during the first portion 411.

Additionally, while the timing diagram 400 schematically depicted in FIG. 4 illustrates a consistent intensity of flash throughout the first portion 411, it will be appreciated that an intensity and/or color temperature of light emitted by the flash unit during the first portion 411 of the flash operation 410 can vary. For example, the intensity can increase between times $T_1$ and $T_2$ while one or more image capture settings applied by the main camera, e.g., an AEC setting, AF setting, and/or AWB setting are varied. In this way, the scene undergoing flash photography can be sampled with different flash outputs (e.g., intensity and/or color temperature) and different image capture settings. Further, while the first portion 411 in FIG. 4 spans 8 frames received by the main camera, those having skill in the art will appreciate that a first portion of a flash operation where one or more image capture settings are estimated or determined can span different numbers of image frames. In some implementations, the duration for the first portion 411 can depend on the amount of adjustment of an exposure setting that is required based on the emitted flash, the brightness of the environment, a distance from a region of interest from the camera, and/or a reflectance of an object in the scene associated with the region of interest. For example, the number of frames required during the first portion 411 to determine an automatic exposure control setting can be less in a first scene where an object is far away from the camera as compared to a second scene where the object is closer to the camera since the emitted flash would have less effect on the illumination of the object in the second scene. In this way, the number of frames required during the first portion 411 can be dynamic and/or adjusted based on scene conditions.

With continued reference to FIG. 4, it can be undesirable to change a frame rate that a camera operates at between a first portion of a flash operation and a second portion of the flash operation because hardware configurations may not support an immediate transition for a sensor between frame rate modes. That is to say, causing a camera to transition between a first frame rate and a second frame rate can result in an initialization transition period between the end of the first mode in which the first frame rate is applied and the start of the second mode in which the second frame rate is applied. Moreover, transitioning from a first frame rate during a first portion of a flash operation to a lower frame rate during a second portion of the flash operation may result in aberrations in a preview stream that is displayed to a user during the first portion. For example, generating a preview stream based on a relatively higher frame rate in the first portion may be displeasing to a user due to noise associated with amplified gain resulting from the shorter exposures (less light captured per frame) and/or a change in supported resolution between frame rate modes, which may exhibit significant blur. That said, as noted above, those having skill in the art will appreciate that aspects disclosed herein can be practiced using a single camera.

Still referring to FIG. 4, since it can be undesirable to change a frame rate of the camera between the first portion 411 and the second portion 413, the length of the first portion 411 measured between times $T_1$ and $T_2$ is based on two factors: 1) the number of image frames received by the main camera that are required to determine the image capture settings to be applied during the second portion 413 of the flash operation 410; and 2) the operating frame rate of the main camera which dictates the time needed to receive the required number of image frames (factor 1) for analysis during the first portion 411. For example, if the main camera is operating at 30 fps as illustrated, and 8 image frames are required to determine image capture settings to apply during the second portion 413 of the flash operation 410, the first portion or pre-flash phase can require about 267 milliseconds ("ms"). In another example, the main camera may operate at a lower frame rate in low light conditions such as 10 fps or 15 fps, which would require 800 ms and 534 ms, respectively, to complete the first portion 411 of the flash operation 410 before the flash capture occurs during the second portion 413. Moreover, as schematically illustrated in the diagram 400, the second portion 413 of the flash operation 410 can also require more than one frame to be captured by the main camera to accommodate a delay in ramping the flash intensity up from the first intensity 401 to the second intensity 403 and/or based on a time required to apply the determined image capture settings to the main camera sensor.

As mentioned above, those having skill in the art will appreciate that any noticeable delay or lag between an input to capture an image frame of a scene that initiates a flash capture operation (e.g., an input at or shortly before time $T_1$) and the time that the image frame capture of the scene is completed (e.g., at or shortly following time $T_3$) can be frustrating to a user when the user is intending to capture a special moment. For example, when a user desires to capture an image frame depicting a scene including one or more fast moving objects, a pre-flash delay of 534 ms may result in the scene changing significantly between the time that the capture input is received and the time that an image frame depicting the scene is captured and stored. In another example, a portraiture application with emphasis on a desired facial expression and/or eye gaze can be frustrated by exposing the subject(s) to a relatively lengthy pre-flash. Additionally, the delays or lags caused by a non-capture portion of a flash operation (e.g., the first portion 411) can be especially exasperated when a user desires to capture a series of image frames in rapid succession using a flash unit. For example, a series of rich moments of a newborn baby giggling, smiling, and/or having an aesthetically pleasing eye gaze may fade away quickly before a suitable series of image frames memorializing the occasion can be captured. In another example, a flash may be used in low light conditions for facial recognition and/or authentication. For example, facial recognition can be used to provide access to a mobile device and may require a flash in some scene conditions to receive sufficient image data for analysis. In such examples, a shorter flash operation may be desirable to limit disturbances within the scene (e.g., in a movie theater, in a dark bedroom, at a play, etc.).

In some implementations of the present disclosure, a duration of first portion of a flash operation (e.g., a pre-flash or pre-capture phase) can be reduced by operating a second camera (e.g., an auxiliary camera) at an increased frame rate relative to a frame rate of a first camera (e.g., a main camera) that is intended to be used to capture one or more image frames during a second portion of the flash operation (e.g., a capture phase). For example, the first camera can be operated throughout the flash operation at a constant frame rate of 10 fps, 15 fps, or 30 fps while the second camera can be operated at a constant frame rate of 60 fps, 120 fps, or 240 fps. In this way, a required number of image frames received by the second camera during the first portion can be used to determine image capture settings to be applied to the first camera in less time than would be required to receive the same number of frames by the first camera given the lower frame rate of the first camera. As a result, a first portion (e.g., a pre-flash or pre-capture phase) in a flash photography operation can be significantly reduced as compared to some existing techniques. Moreover, a flash output during a first portion of a flash photography operation when image capture settings are determined can optionally be as high of an intensity as a flash output during a second portion of the flash photography operation when one or more image frames are captured because the reduced duration of the first portion will not result in flash damage and/or the duration may not affect the subject in a way that would hinder the subsequent image capture. Additionally, limited the duration of the first portion may also reduce battery consumption required to power the flash unit. Therefore, image capture setting determination can be improved since a processor will receive a plurality of frames that are subject to the same, or similar, flash illumination that will be present in the scene at the moment(s) of capture.

Accordingly, implementations disclosed herein can improve flash photography responsiveness and user experience in flash photography applications. Moreover, implementations disclosed herein can enable a device to capture more image frames during an image capture portion. For example, decreasing the time required for a pre-flash phase of a flash operation can extend a time that the flash can be emitted during a capture phase of the operation allowing for more frames to be captured. Additionally or alternatively, decreasing the time required for a first portion of flash operation where one or more image settings are determined can allow a greater number of flash operations to be performed in series in a given span of time.

Figure 5:
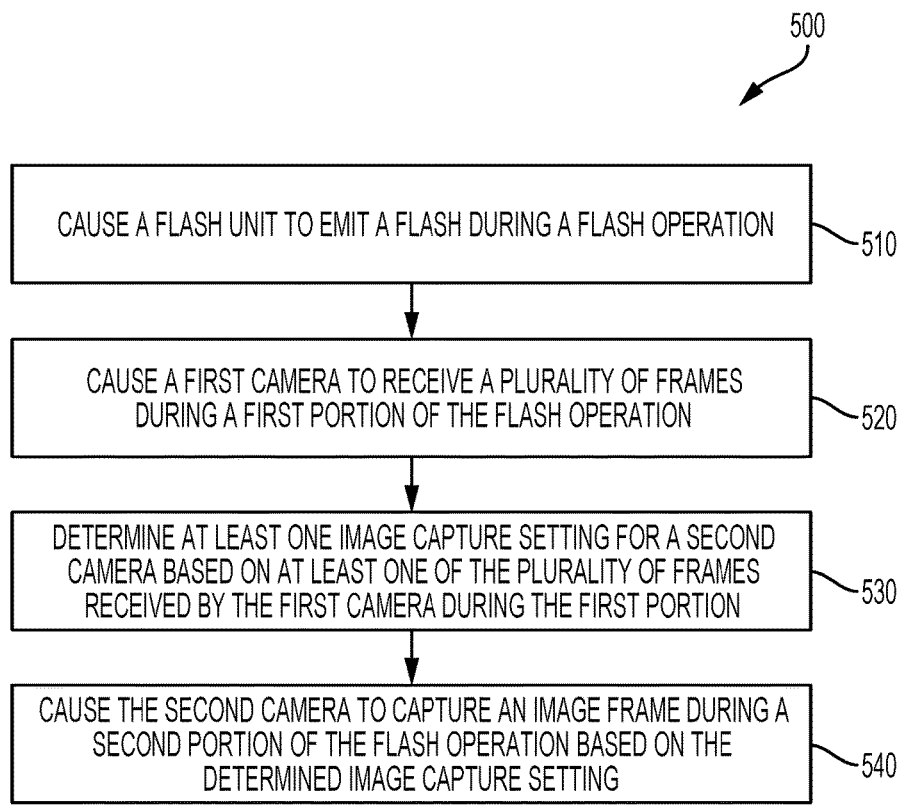
FIG. 5 is a flow chart illustrating an example operation for determining an image capture setting for use when capturing an image frame of a scene that is illuminated by a flash unit.

FIG. 5 is an illustrative flow chart depicting an example operation 500 for capturing one or more image frames in conjunction with a flash operation. The example operation 500 is described below with reference to the flash unit 325, the first camera 302, and the second camera 304 of device 300. Of course, it will be understood that the first camera 302 and the second camera 304 can be interchanged in the operation 500. That is, while the example operation 500 in FIG. 5 makes reference to a "first camera," the first camera 302 or the second camera 304 can perform the functions of the first camera or the second camera mentioned in the operation 500. Moreover, additional cameras (e.g., a third camera, a fourth camera, etc.) not shown in FIG. 3 can be utilized. Lastly, in some implementations a single camera can be used and it will be understood that in these implementations the first camera discussed with reference to example operation 500 is the same camera as the second camera that is referenced.

The operation 500 begins by causing the flash unit 325 to emit a flash during a flash operation (510). The flash operation can include, at least, a first portion and a second portion. Optionally, the first portion and the second portion can be continuous within the flash operation. That is to say, in some implementations, the second portion can commence at the same point in time that the first portion concludes. In some implementations the flash unit 325 can be caused to emit a flash continuously throughout the first portion and the second portion of the flash operation. In other implementations, the flash unit 325 can be caused to emit a flash continuously throughout a sub-portion of the flash operation without emitting the flash continuously throughout the entire flash operation. For example, the flash unit 325 can be initialized to emit a flash during the first portion of the flash operation such that the flash unit does not immediately emit the flash once the first portion commences but proceeds to emit the flash at a point in time after the commencement of the first portion. In some implementations, the flash unit 325 can be caused to adjust at least one of an intensity of the flash emitted during the first portion or a color temperature of the flash emitted during the first portion. In additional implementations, the flash unit 325 can emit a flash at a constant intensity and color temperature during the second portion, and a flash intensity emitted during the second portion and/or color temperature emitted by the flash unit during the second portion can be equal to a flash intensity and/or color temperature emitted during the first portion.

Still referring to FIG. 5, the operation 500 includes causing the first camera 302 to receive a plurality of image frames during the first portion (520). Each of the image frames received by the first camera during the first portion of the flash operation can be received using a first exposure length applied by a sensor. In some implementations, this can be a result of a received instruction from the processor 306. For example, an instruction to capture one or more image frames (including a single image frame, a plurality of image frames, and/or a sequence of images frames or video) using the second camera can be generated based on a user input. In another example, an instruction to capture the one or more image frames can be based on an image analytics management module and/or by an application associated with the device 300. When the first camera 302 is powered down and/or in a sleep state, the camera controller 312 can optionally cause the first camera 302 to power on or otherwise have the device 300 supply power to begin initialization of the first camera 302.

In some implementations, the first camera 302 receives the plurality of image frames using an initial image capture setting. The initial image capture setting can be a set value that is always used when initializing the first camera 302, for example, a default image capture setting may be applied to receive a first frame of the plurality of image frames. In other implementations, the initial image capture setting can be based on a previously applied image capture setting that is accessed from system memory, for example, an image capture setting used on a preceding image frame received by the first camera 302 before the receipt of the initial frame of the plurality of image frames. In such implementations, the image capture setting can be determined based on the scene conditions of the preceding image frame alone or can be predictively determined based on a plurality of image frames that were received prior to the receipt of the first image frame. In some implementations, the image capture settings applied to the first camera 302 can be varied as the plurality of image frames are received while the flash unit emits a flash during the first portion. In this way, samples with different image capture settings applied can be correlated to an output of the flash unit.

With continued reference to FIG. 5, the operation 500 continues by determining at least one image capture setting for a second camera 304 based on at least one of the plurality of image frames received by the first camera during the first portion (530). In some implementations, the operation 500 optionally includes causing the second camera 304 to receive one or more image frames during the first portion and the image capture setting determination can be based on at least one of the plurality of image frames received by the first camera during the first portion and on at least one image frame received by the second camera during the first portion.

Example aspects of an image capture setting include an AWB setting, an AF setting, and/or an AEC setting. An AEC setting may be used to control the amount of time a sensor of the first camera 302 is configured to receive light (e.g., an exposure time). Thus, in determining an AEC setting for one or more upcoming image frames, the device 300 may determine if one of the plurality of image frames received by the first camera 302 during the first portion is too light or too dark (such as measuring the luminance of an image capture against one or more thresholds). In this way, the plurality of image frames received by the first camera 302 can be correlated to a flash output of the flash unit during the first portion to determine the at least one image capture setting for the second camera.

An AWB setting may be an adjustment to the color balance of an image frame (such as to prevent the colors of an image being saturated or muted). In determining an AWB setting for the image capture setting, the device 300 may determine if the colors of the at least one of the plurality of image frames received by the first camera are saturated or muted, for example, by measuring the color balance of at least a portion of the at least one image frame, which may include a blue/green color ratio and/or a red/green color ratio, against one or more thresholds. Based on this, the determination of the image capture setting can account for degrees of saturation or muting exhibited in the image frame samples received by the first camera during the first portion of the flash operation.

An AF setting may adjust a camera focus setting. In some embodiments, the AF setting may determine a correct focus for a specific region of interest or subject. For example, an AF setting may be adjusted to focus an optical system on a foreground object such as a face. In this way, image capture settings can be determined to account for the expected scene conditions (e.g., lighting and/or motion) of the scene as based on the conditions present when the at least one image frame was received by the first camera.

Still referring to the operation 500 of FIG. 5, in some implementations the image capture setting for the second camera can be based on a mapping between the first camera and the second camera. It will be understood that the first and second cameras can be differently configured so as to differ in field-of-view, optics, and/or sensor sensitivity. For example, the first and second cameras may have sensors that differ in terms of pixel size, spatial resolution, and/or vendor. As a result, determining the image capture setting for the second camera based on at least one image frame received by the first camera during the first portion may require a mapping between different image capture settings that would be applied by each camera for a common scene. One example process that can be used to map image capture settings between cameras includes independently capturing a series of image frames on each of the first and second cameras of a common scene as light incident on the scene is adjusted, and/or as relative motion is exhibited in the scene. The image capture settings determined by each camera can be mapped based on corresponding image frames and the values can be stored in a lookup table, for example, that can be used to interpolate correspondences or the relations between the image capture settings applied by each separate camera can be theoretically modeled based on the testing samples.

The operation 500 continues by causing the second camera 304 to capture one or more image frames during the second portion of the flash operation based on the determined image capture setting (540). Each of the one or more image frames captured by the second camera during the second portion being captured using a second exposure length that is greater than the first exposure length. In some implementations, the second camera 304 can run at relatively a lower frame rate than the first camera 302. In this way, the first camera 302 can be utilized to capture sample image frames for use in determining image capture settings in less time than would be required to capture the same number of sample image frames using the second camera 304. As a result, a length of the first portion of the flash operation can be reduced along with an overall duration of the flash operation by analyzing image frames received by the first camera during the first portion of the operation and capturing one or more image frames by the second camera during the second portion. Additionally, this overall reduction can be used to extend a length of the second portion or capture phase of the flash operation to enable a user to capture multiple image frames of a scene with a single flash.

In some implementations, the operation 500 includes displaying a preview stream during the first portion based on image frames received by the second camera. In this way, although one or more image frames received by the first camera during the first portion can be used to determine an image capture setting, the preview stream viewed by a user is not affected and reflects the scene as viewed from the second camera.

Figure 6:
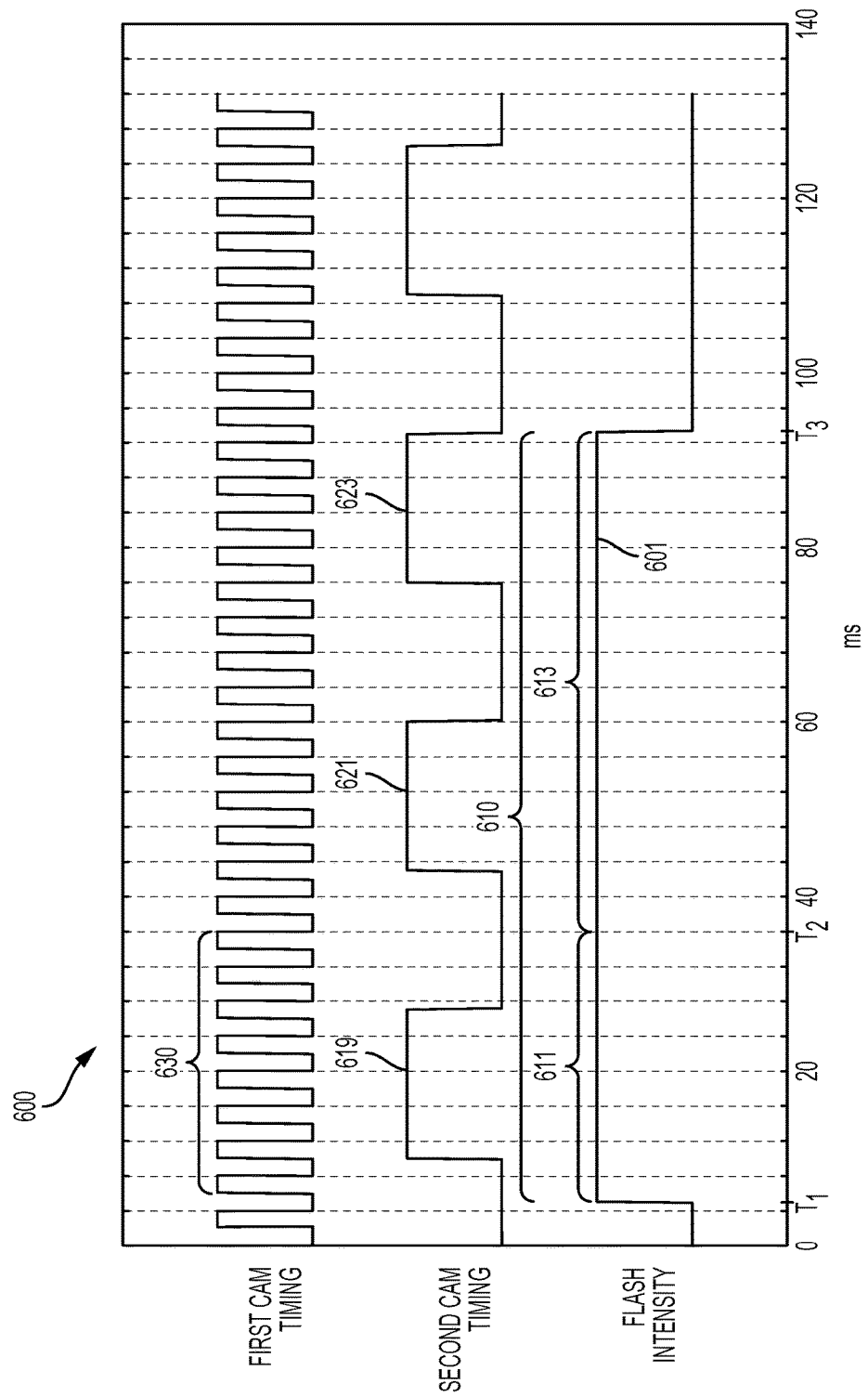
FIG. 6 is an illustrative timing diagram depicting one example operation of determining an image capture setting in accordance with the example operation of FIG. 5.

Turning now to FIG. 6, a timing diagram 600 is schematically illustrated to depict an example operation of determining one or more image capture settings for use in capturing one or more image frames during a flash operation 610. As shown, the diagram 600 includes a sequence of image frames for a first camera ("FIRST CAM TIMING") and a sequence of image frames for a second camera ("SECOND CAM TIMING"). The first camera is shown to operate at a frame rate of 240 fps and the second camera is shown to operate at a frame rate of 30 fps. However, those having skill in the art will appreciate that the diagram 600 of FIG. 6 depicts one example timing diagram and that aspects of the present disclosure are not limited to these example frame rates. For example, the first and second cameras can each operate at relatively lower or higher frame rates (e.g., 10 fps, 15 fps, 20 fps, 45 fps, 60 fps, 90 fps, 120 fps, 360 fps, etc.). In some implementations, the first camera can operate at a relatively higher frame rate than the second camera such that a sensor of the first camera processes more image frames in a time T than a number of image frames processed by the second camera during the time T.

Also depicted in the timing diagram 600 of FIG. 6 is a flash intensity output by a flash unit during a flash operation 610. Although the timing diagram 600 depicts an output of the flash unit in terms of flash intensity, those having skill in the art will appreciate that the color temperature of the flash output by the flash unit could also be depicted with reference to the discussion of the flash operation 610. In some aspects, a flush unit can include two or more flash elements combined to adjust an output color temperature. In any case, the depicted flash operation 610 begins at time $T_1$ and concludes at time $T_3$. The flash operation 610 includes a first portion 611 spanning between time $T_1$ and a time $T_2$, and a second portion 613 spanning between time $T_2$ and $T_3$. As discussed in further detail below, those having skill in the art will appreciate that aspects of the present disclosure can be implemented in flash operations having additional portions. For example, a third portion (not depicted in FIG. 6) can optionally precede the first portion 611, be disposed between the first and second portions, or follow the second portion 613.

As discussed above, some implementations of flash operations include a first portion (e.g., a pre-flash period) during which one or more image capture settings can be determined for use in a second portion (e.g., a capture period) based on the flash output during the first portion and an analysis of image frames received during the first portion. For example, AEC, AF, and/or AWB settings for use in capturing and processing one or more images during a second portion of a flash operation can be determined based on the analysis of a sequence of frames received during a first portion of the operation to account for motion and/or scene lighting conditions. In such implementations, a length of the first portion of the flash operation can be dependent on a number of image frames required for use in determining the one or more image capture settings and a length of time required to receive the required number of image frames. As shown in FIG. 6, operating a first camera at a relatively higher frame rate than a second camera during the first portion 611 of the flash operation can reduce the time required to complete the first portion as compared to implementations where only image frames received from the second camera are used. Additionally, operating the second camera at a lower frame rate than the first camera can allow for longer exposure periods for use in capturing one or more image frames 621, 623 during the second portion 613 of the flash operation 610.

For example, the first camera in FIG. 6 is shown to receive 8 image frames 630 during the first portion 611 of the flash operation 610 in diagram 600. During the same duration (e.g., between times $T_1$ and $T_2$), the second camera is shown to receive a single image frame 619. As a result, the first camera is able to receive 8 image frames in approximately 33 ms whereas the second camera would require approximately 267 ms to receive 8 image frames. Thus, analyzing 8 frames received by the first camera can be performed in significantly less time than analyzing 8 frames received by the second camera. In this way, the first portion 611 and overall flash operation 610 can be performed much faster than existing techniques that rely on a single camera operating at a steady frame rate for both the first portion and second portion of a flash operation. Those having skill in the art will appreciate that the image capture settings applied by the second camera during the second portion 613 can also be based on any image frames received by the second camera during the first portion 611, for example, image frame 619, in addition to the image frames 630 received by the first camera.

Other benefits of the aspects disclosed herein in addition to user experience improvement in terms of image capture responsivity include reduced power consumption and the ability to prolong a capture portion (e.g., the second portion 613 depicted in FIG. 6) so as to capture more image frames in a single flash operation as compared to existing techniques that require longer pre-flash or image capture setting determination phases. In some applications, this capture of multiple image frames in a single flash operation may enable more robust computational photography operations using a flash (e.g., high dynamic range imaging of a scene illuminated by a flash unit).

Figure 7:
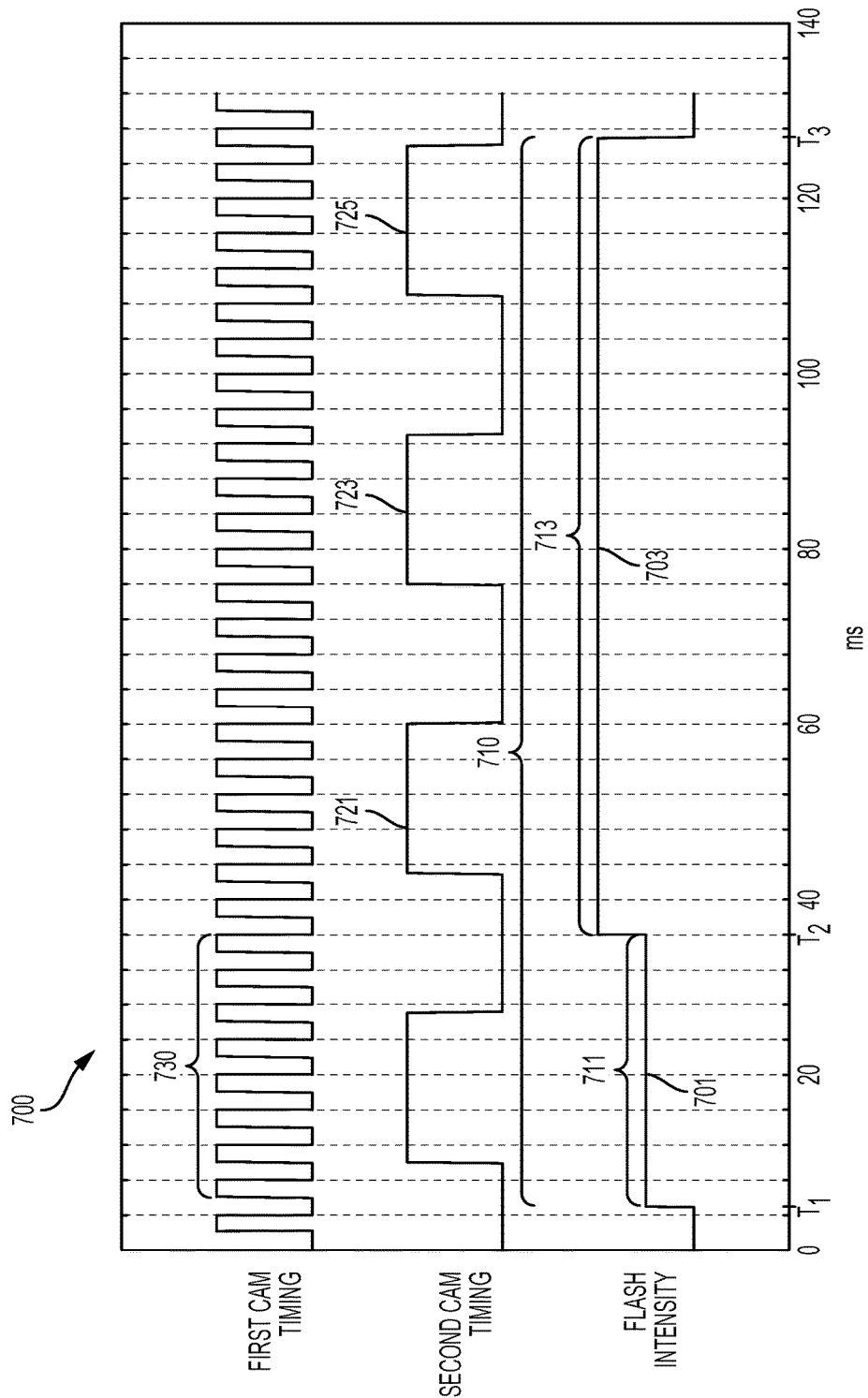
FIG. 7 is an illustrative timing diagram depicting another example operation of determining an image capture setting in accordance with the example operation of FIG. 5.

Turning now to FIG. 7, a timing diagram 700 is schematically illustrated to depict another example operation of a flash operation 710. Similar to the diagram 600 of FIG. 6, the diagram 700 depicts a sequence of image frames received by a first camera ("FIRST CAM TIMING") and a sequence of image frames received by a second camera ("SECOND CAM TIMING"). As shown, the first camera can be configured to operate at a relatively higher frame rate than the second camera so as to receive 8 image frames 730 during a first portion 711 of a flash operation 710 while the second camera receives a single image frame during the first portion (between time $T_1$ and time $T_2$). In this way, a duration of the first portion 711 can be reduced as compared to an implementation where 8 image frames need to be received by the second camera to complete the first portion 711 of the flash operation 710.

In some implementations, the reduction of the first portion 711 can be leveraged to extend a second portion 713 of the flash operation 710 so as to allow the second camera to capture more image frames during the second portion. For example, a duration of the second portion 713 allows the second camera to receive three image frames 721, 723, 725 between time $T_2$ and time $T_3$. Thus, those having skill in the art will appreciate that the reduction in pre-flash or an image capture setting determination phase duration enabled by techniques disclosed herein can be leveraged to enable a "burst" capture of a plurality of image frames during a second portion (e.g., an image capture phase) of a flash operation. Additionally, those having skill in the art will appreciate that an intensity emitted by a flash unit in such implementations can be reduced during the first portion 711 of the flash operation as compared to the full flash applied during the second portion 713 to further prolong the second portion 713 as compared to implementations (e.g., FIG. 6) where a first portion can include flash output at a full intensity. For example, diagram 700 depicts a flash intensity 701 emitted during the first portion 711 of the flash operation that is lower than a flash intensity 703 emitted by the flash unit during the second portion 713.

In some devices, running two or more cameras at the same time can have a considerable impact on power consumption. It such devices, it can be desirable to practice aspects of the present disclosure by selectively running two or more cameras to aid in image capture setting determination and application. For example, although not depicted in FIG. 6 or 7, in some implementations the first camera in those examples can be instructed to receive image frames at a higher frame rate than the first camera only during the first portion of a flash operation. That is to say, the first camera can operate to receive a plurality of image frames for use in determining an image capture setting to be applied by the second camera in response to an instruction to commence a flash photography operation, and the first camera can be powered down, or transitioned to a lower frame rate mode, once the requisite plurality of image frames are received. Additionally, in some implementations, a user can selectively apply the techniques disclosed herein. For example, a device may provide a user selectable menu of two or more flash photography modes with a first mode providing for a faster, more responsive flash operation than a second mode. As a result, multiple cameras can be selectively, and/or intermittently, operated in parallel to achieve any of the benefits described herein while limiting overall power consumption.

Certain aspects and embodiments of this disclosure have been provided above. Some of these aspects and embodiments may be applied independently and some of them may be applied in combination as would be apparent to those of skill in the art. In the foregoing description, for the purposes of explanation, specific details are set forth in order to provide a thorough understanding of embodiments of the invention. However, it will be apparent that various embodiments may be practiced without these specific details. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Moreover, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Further, the various illustrative logical blocks, modules, circuits, and algorithm steps described in connection with the embodiments disclosed herein may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A device comprising:
   a memory; and
   a processor coupled to a first camera, a second camera, a flash unit, and the memory, the processor configured to:
      cause the flash unit to emit a flash during a flash operation, the flash operation including a first portion and a second portion;
      cause the first camera to receive a plurality of image frames during the first portion using a first exposure length;
      determine at least one image capture setting for the second camera based on at least one of the plurality of image frames received by the first camera during the first portion; and
      cause the second camera to capture one or more image frames during the second portion based on the determined image capture setting, wherein each of the one or more captured image frames are captured using a second exposure length that is greater than the first exposure length.

2. The device of claim 1, wherein the processor is further configured to:
   cause the first camera to operate at a first frame rate during the first portion; and
   cause the second camera to operate at a second frame rate during the second portion, wherein first frame rate is higher than the second frame rate.

3. The device of claim 1, wherein the processor is further configured to:
   cause the second camera to receive one or more image frames during the first portion; and
   determine the at least one image capture setting for the second camera based on at least one image frame received by the second camera during the first portion.

4. The device of claim 1, wherein the determined image capture setting comprises at least one of the group consisting of: an exposure control setting, a white balance setting, a focal distance setting, and a flash unit setting.

5. The device of claim 1, further comprising:
   the flash unit;
   the first camera; and
   the second camera.

6. The device of claim 5, wherein the flash unit comprises a display.

7. The device of claim 1, wherein the processor is further configured to cause the flash unit to adjust at least one of an intensity and a color temperature of the flash emitted during the first portion.

8. The device of claim 7, wherein the processor is further configured to cause the flash unit to emit the flash at a constant intensity and color temperature during the second portion.

9. The device of claim 1, wherein a flash intensity emitted during the first portion is equal to a flash intensity emitted during the second portion.

10. The device of claim 1, wherein the first portion is preceded during the flash operation by a flash initialization portion, wherein the processor is further configured to cause the flash unit to emit the flash during at least a portion of the flash initialization portion.

11. The device of claim 1, wherein the first portion and the second portion are continuous within the flash operation.

12. The device of claim 11, wherein the processor is further configured to cause the flash unit to continuously emit the flash between the first portion and the second portion of the flash operation.

13. The device of claim 1, wherein the flash operation includes a third portion that precedes the first portion.

14. The device of claim 13, wherein the processor is further configured to:
cause the second camera to receive one or more image frames during the third portion; and
cause the first camera to apply at least one image capture setting during the first portion based on the one or more image frames received by the second camera during the third portion.

15. The device of claim 1, wherein the processor is further configured to determine the image capture setting based on a mapping between an image capture setting for the second camera and an image capture setting for the first camera.

16. A method comprising:
causing a flash unit to emit a flash during a flash operation, the flash operation including a first portion and a second portion;
causing a first camera to receive a plurality of image frames during the first portion using a first exposure length;
determining at least one image capture setting for a second camera based on at least one of the plurality of image frames received by the first camera during the first portion; and
causing the second camera to capture one or more image frames during the second portion based on the determined image capture setting, wherein each of the one or more captured image frames are captured using a second exposure length that is greater than the first exposure length.

17. The method of claim 16, further comprising:
causing the first camera to operate at a first frame rate during the first portion; and
causing the second camera to operate at a second frame rate during the second portion, wherein first frame rate is higher than the second frame rate.

18. The method of claim 16, further comprising:
causing the second camera to receive one or more image frames during the first portion; and
determining the at least one image capture setting for the second camera based on at least one image frame received by the second camera during the first portion.

19. The method of claim 16, wherein the determined image capture setting comprises at least one of the group consisting of: an exposure control setting, a white balance setting, a focal distance setting, and a flash unit setting.

20. The method of claim 16, wherein the flash unit comprises a display.

21. The method of claim 16, further comprising:
causing the flash unit to adjust at least one of an intensity and a color temperature of the flash emitted during the first portion.

22. The method of claim 21, further comprising:
causing the flash unit to emit the flash at a constant intensity and color temperature during the second portion.

23. The method of claim 16, wherein a flash intensity emitted during the first portion is equal to a flash intensity emitted during the second portion.

24. The method of claim 16, further comprising:
causing the flash unit to emit the flash during at least a portion of a flash initialization portion, wherein the first portion is preceded during the flash operation by the flash initialization portion.

25. The method of claim 16, wherein the first portion and the second portion are continuous within the flash operation.

26. The method of claim 25, further comprising:
causing the flash unit to continuously emit the flash between the first portion and the second portion of the flash operation.

27. The method of claim 16, wherein the flash operation includes a third portion that precedes the first portion.

28. The method of claim 27, further comprising:
causing the second camera to receive one or more image frames during the third portion; and
causing the first camera to apply at least one image capture setting during the first portion based on the one or more image frames received by the second camera during the third portion.

29. The method of claim 16, further comprising:
determining the image capture setting based on a mapping between an image capture setting for the second camera and an image capture setting for the first camera.

30. A non-transitory computer-readable storage medium storing instructions thereon that when executed cause one or more processors to:
cause a flash unit to emit a flash during a flash operation, the flash operation including a first portion and a second portion;
cause a first camera to receive a plurality of image frames during the first portion using a first exposure length;
determine at least one image capture setting for a second camera based on at least one of the plurality of image frames received by the first camera during the first portion; and
cause the second camera to capture one or more image frames during the second portion based on the determined image capture setting, wherein each of the one or more captured image frames are captured using a second exposure length that is greater than the first exposure length.

* * * * *